May 7, 1940.                J. LAMOND                2,200,181
                            GAUGE TOOL
                        Filed July 11, 1939              2 Sheets-Sheet 1
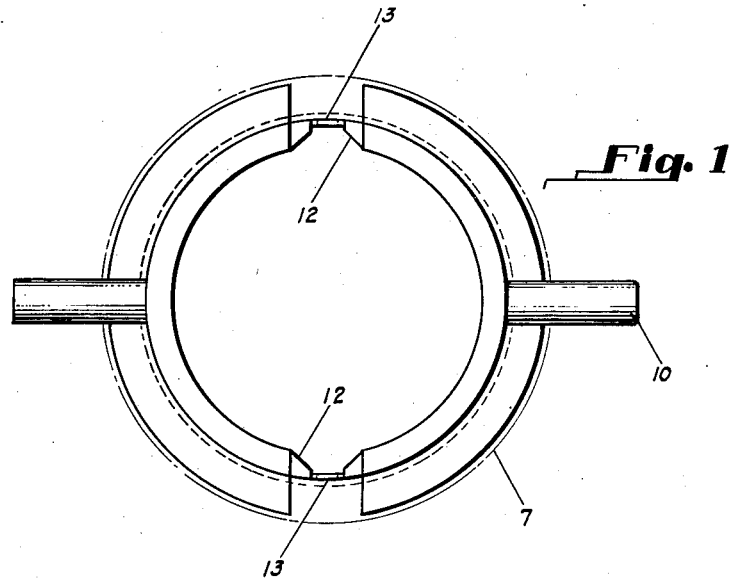
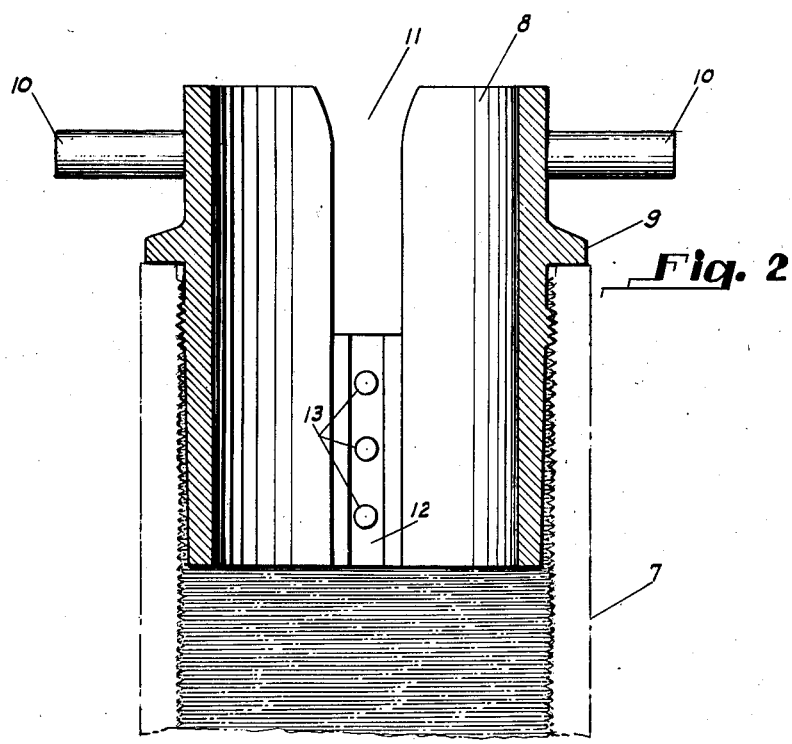
INVENTOR.
John Lamond,
BY
Archworth Martin,
ATTORNEY.

May 7, 1940.   J. LAMOND   2,200,181
GAUGE TOOL
Filed July 11, 1939   2 Sheets-Sheet 2

INVENTOR.
John Lamond,
By Archworth Martin,
ATTORNEY.

Patented May 7, 1940

2,200,181

UNITED STATES PATENT OFFICE 2,200,181

GAUGE TOOL

John Lamond, Allison Park, Pa., assignor to Pittsburgh Pipe & Coupling Company, Allison Park, Pa., a corporation of Pennsylvania Application July 11, 1939, Serial No. 283,793

6 Claims. (Cl. 33—199)

My invention relates to a tool that can conveniently be employed in connection with various types of gauges such as those used in measuring pipe couplings and the like, for the purpose of ascertaining whether the threaded portion of the coupling has been properly tapered, whether the thread pitch or lead is accurate, and whether the threads have been cut to the proper depth.

In order to facilitate accurate testing or measuring of the thread taper, the thread pitch and the thread depth, it has been customary to mark lines on the threaded surface at predetermined spaced points, to facilitate the proper positioning of the feeler or contact points of the gauges when making the readings, it being desirable to remove the chalk (if chalk is used) from between the threads previous to taking the readings, so as to avoid inaccuracy of measurement.

My invention has for its object the provision of a tool which is of such form that accuracy of positioning of the contact points of the gauge is insured, without the use of any chalk and with a greater degree of accuracy than is possible with the use of chalk.

Figure 3:
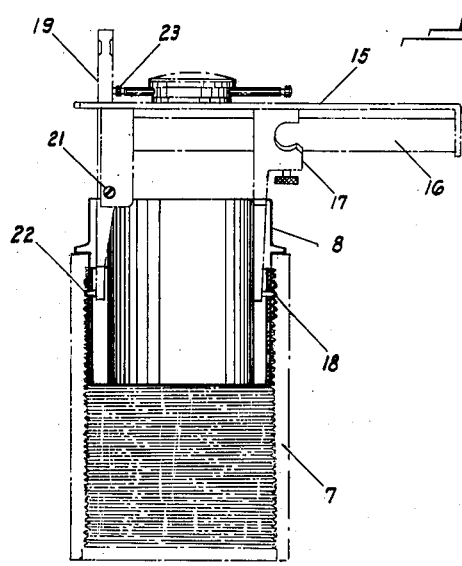
Figure 4:
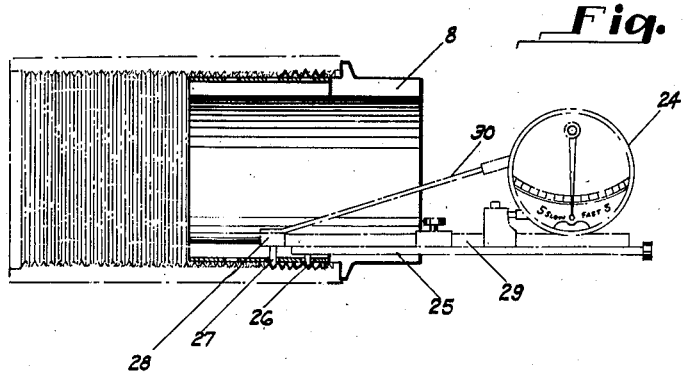
Figure 5:
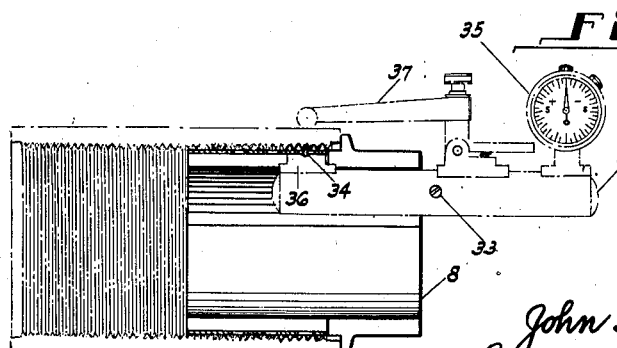

One form which my invention may take is shown in the accompanying drawings wherein Figure 1 is an end view of the tool; Fig. 2 is a longitudinal sectional view thereof showing the same placed in a pipe coupling ready to receive a gauge instrument; Fig. 3 is a longitudinal sectional view showing a taper-gauging instrument in use with the tool; Fig. 4 is a longitudinal sectional view showing the manner in which a thread-pitch gauge is employed; and Fig. 5 shows the manner in which the tool is employed with a thread-depth gauge.

A pipe coupling or other internally-threaded object is indicated by the numeral 7, a tool 8 being shown in place therein, ready to receive a thread gauging or measuring instrument. The tool 8 is of generally tubular form and has a short thread at about its mid portion for engagement with the threads of the coupling 7, whereby it will be maintained in a stable position in the coupling while measurements are being taken. The tool has an annular shoulder 9 that seats against the adjacent end of the coupling 7 when the tool is screwed tightly into position, and is also provided with handles 10 whereby it can conveniently be manipulated. The tool will be threaded for a greater distance when it is to be employed also as a plug gauge, as hereinafter explained.

The tool has longitudinally-extending slots 11 formed at diametrically opposite points, and continuing inwardly beyond the slots are channels or grooves 12 through which holes 13 extend so as to expose the coupling threads to the interior of the tool 8 and render them accessible to the feeler points of the measuring instruments. The holes 13 are placed at predetermined distances apart, and so that their centers will be radially opposite to the roots of threads on a coupling when the tool is in place thereon. Ordinarily the distance from center to center of adjacent holes can conveniently be equal to four times the thread pitch or other predetermined spacing.

Referring now more particularly to Fig. 3, I show a gauge 15 of a form known in the industry and comprising a body portion 16 having an arm 17 which is adjustable longitudinally of the member 16 and may be set at fixed positions thereon to permit the tool to be used with pipe couplings of various diameters. The arm 17 carries a contact point of feeler stud 18 that can be inserted through the holes 13 at one side of the tool 8. An arm 19 is pivotally mounted at 20 upon the member 16 and carries a feeler stud or contact point 22 that is insertible through the holes 13 at the opposite side of the tool 8. Near its upper end the lever 19 operates against a push rod 23 that in turn is connected with a gauge pointer, so that said pointer is oscillated through movements of the rod 23. The gauge is of a type well known in the art and need not be described in detail.

In testing the accuracy of taper of the coupling 7, the points 18 and 22 will be inserted through two of the endmost holes 13, will then be moved to the intermediate holes, and finally to the two other endmost holes, so that three readings can be had on the gauge that will indicate the diameter at each of the three points at which measurements have thus been taken, and hence the degree of taper. The operator can thereby tell whether the thread has been cut to the proper taper.

In Fig. 4 I show a gauge 24 provided with a normally rigidly fixed arm or extension 25 that carries a feeler stud or contact point 26. A stud or feeler 27 is carried by a block 28 that is slidable on a bar member 29 of the gauge and has connection with a link or push rod 30 which is in turn operatively connected to the pointer of the gauge 24, so that shifting movements of the pointer 27 through camming action of the sides of a thread will effect oscillation of the pointer. Here again the gauge is of a type known in the industry and does not require a detailed description.

In the testing of the threads for pitch, the studs 26 and 27 will be inserted through holes 13 of the tool 8, at one side of the tool, and if the thread pitch is inaccurate, the link 30 will be shifted through camming action of the thread, and thus move the pointer of the gauge, so that the operator can determine any inaccuracy and the extent thereof. Further readings can be similarly had by inserting the studs 26 and 27 through other holes in the tool 8. The holes 13 are of somewhat larger diameter than the studs 26 and 27, so as to permit of the necessary movement of the stud 27 longitudinally of the tool 8 when inaccurate threads are encountered.

Fig. 5 shows the tool 8 employed in connection with another known type of gauge, for measuring tooth depth. In this instance the body portion 32 of the gauge has a lever mounted therein on a pivot 33, the outer end of the lever carrying a contact point or feeler stud 34 that will be inserted through successive holes 13 at one side of the tool 8. The opposite end of said lever (not shown) has operative connection with the pointer of the gauge 35, and if a thread has not been cut to proper depth or is of improper height, the stud 34 will project a greater or a lesser distance from the nose portion 36 of the casing 32, and the pointer 35 moved correspondingly. A spring-pressed lever arm 37 serves to hold the nose portion 36 snugly against the tops of the threads, so as to facilitate the taking of measurements.

The tool when tapered and threaded over the major portion thereof which extends inwardly of the shoulder 9 and of such diameter that it will not, when screwed hand tight, enter a taper threaded coupling quite far enough for the shoulder to abut the end of the coupling, can be used also as a plug gauge in testing for "stand-off." The approved stand-off test requires that when a plug gauge is screwed into the coupling by hand tight force, the stop shoulder must stand away from the end of the coupling a predetermined distance; so that when the coupling is later applied to a pipe with sufficient turning force, none of the pipe thread will be exposed at the end of the coupling. This is to insure that there is sufficiently tight fit of the pipe and coupling. The tool can thus not only be employed for measuring thread taper, thread pitch and thread depth, but as a plug gauge.

From the foregoing it will be seen that I provide a tool whereby thread measurements can readily be taken at definitely located points upon any number of threaded articles, with assurance that the measurements will be taken at the proper locations in each article.

I claim as my invention:

1. A gauge tool for use with pipe thread gauges and the like, comprising a tubular member which is threaded for a portion of its length, for connection with a threaded tubular article and provided with axially-spaced holes in its side wall through which contact points of thread gauges may be brought into engagement with the thread on said article, the said member being provided with a stop shoulder for engaging the adjacent end of said article.

2. A gauge tool for use with pipe thread gauges and the like, comprising a tubular member having an external thread for engagement with an internally-threaded article, and provided with axially spaced holes whose center-to-center spacing is a multiple of the thread pitch and through which contact points of thread gauges may be brought into engagement with the thread on the article.

3. A gauge tool for use with pipe thread gauges and the like, comprising a member which is threaded for a portion of its length, for engagement with a threaded tubular article and provided with a stop shoulder for engaging the adjacent end of said article, and also provided with a hole in its side wall through which contact points of thread gauges may be brought into engagement with the thread on said article.

4. A gauge tool for use with pipe thread gauges and the like, comprising a tubular member having an external thread for engagement with an internally-threaded article, and provided with a plurality of rows of holes through which contact points of thread gauges may be brought into engagement with the thread on the article, the holes of each row being so positioned axially of said member that their centers will be normally in radial alinement with the thread roots of said article, when the member is in threaded engagement with the article.

5. A gauge tool for use in measuring internal threads of taper threaded pipe couplings and the like, comprising a member which is taper threaded exteriorily at a zone intermediate its ends, for engagement with the coupling threads and provided with a stop shoulder at a point spaced outwardly of the outermost end of its thread, and being provided with a hole through that portion which extends into a coupling, through which contact points of thread gauges may be brought into engagement with the thread on the article.

6. A gauge tool for use with pipe thread gauges and the like, comprising a tubular member having an external thread for engagement with an internally-threaded article, that portion of the tool which extends into the article having an axially-extending groove, and a hole being provided through the bottom wall of the groove, so that contact points of thread gauges may be brought into engagement with the thread on the article.

JOHN LAMOND.